US006822546B1

United States Patent
Jakab et al.

(10) Patent No.: US 6,822,546 B1
(45) Date of Patent: Nov. 23, 2004

(54) TRANSFORMER ARRANGEMENT FOR COMBINED POTS AND XDSL SERVICE

(75) Inventors: Gyula G. Jakab, Nepean (CA); Jose Noel N. Manceau, Gatineau (CA); Dan V. Gorcea, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 468 days.

(21) Appl. No.: 09/746,462

(22) Filed: Dec. 26, 2000

(51) Int. Cl.[7] .............................................. H01F 17/06
(52) U.S. Cl. ....................... 336/178; 336/170; 336/180; 336/182
(58) Field of Search ........................... 336/65, 63, 170, 336/171, 178, 180–184, 212, 214, 215, 221, 222

(56) References Cited

U.S. PATENT DOCUMENTS

| | | | | |
|---|---|---|---|---|
| 4,766,365 A | * | 8/1988 | Bolduc et al. | 323/308 |
| 4,788,448 A | * | 11/1988 | Crowe | 307/31 |
| 5,122,947 A | * | 6/1992 | Hishiki | 336/178 |
| 5,737,203 A | * | 4/1998 | Barrett | 363/75 |
| 6,067,316 A | * | 5/2000 | Amrany et al. | 375/220 |

* cited by examiner

Primary Examiner—Tuyen T. Nguyen

(57) ABSTRACT

The current technology involved with overlaying any type of digital subscriber loop (xDSL) service with plain old telephone service (POTS) makes use of two separate transformers, one for POTS and another for xDSL. This invention provides a transformer which combines the POTS transformer and the xDSL transformer into one transformer. This considerably reduces the weight volume and cost of the overlaid POTS and xDSL circuits. In combining the two transformers the magnetic coupling between any one of the windings used for POTS and any one of those used for xDSL must remain weak despite their close proximity. In addition, any two windings of the same type of service, either POTS or xDSL, must remain strongly coupled. This is achieved by choosing a special geometric form for the core and choosing strategic locations for the windings. A portion of the core is dedicated to serve as a shunt for each component of the magnetic field produced by the windings. Strongly coupled windings are wound around a same portion of the core whereas weakly coupled windings are wound around different core portions which are separated by the shunt.

30 Claims, 2 Drawing Sheets

TRANSFORMER ARRANGEMENT FOR COMBINED POTS AND XDSL SERVICE

FIELD OF THE INVENTION

The invention relates to the field of plain old telephone services (POTS) and any type of digital subscriber loop (xDSL). More specifically the invention pertains to the transformers used in overlaid POTS and xDSL technology.

BACKGROUND OF THE INVENTION

Digital subscriber loop (DSL) technology that offers the subscriber a very large bandwidth is engineered to overlay the existing analogue plain old telephone services (POTS). There are several types of DSL systems and the notation for specifying a DSL system of any type is xDSL. The xDSL system requires minimal equipment retrofit. It can be installed very quickly and easily, and is a cost-effective solution for high-bandwidth requirements. xDSL uses the existing copper analogue loop between the central office (CO) and the customer premises equipment (CPE) as its transmission medium, transporting voice in the traditional 4 kHz bandwidth where it has always been, while higher bandwidth digital services are relegated to higher frequency domains. A specific problem faced by overlaid POTS and xDSL technology, as well as other high-performance transmission systems, is the need to keep circuit costs low and packaging density high. Current technology makes use of a transformer for POTS and a second transformer for xDSL services in combination with a low pass filter (LPF) to combine POTS and xDSL services. The transformers have a significant volume and contribute significantly to the cost. Solutions for reducing the cost, volume and number of components in these circuits are therefore sought in the industry. Reducing the number of components also results in a reduction in inventory. In addition, due to the cost of real estate, an increased line density is required and would result in most of the savings per line (per customer) by sharing common equipment costs among a large number of lines.

SUMMARY OF THE INVENTION

The current technology involved with overlaying any type of digital subscriber loop (xDSL) services with plain old telephone services (POTS) makes use of two separate transformers, one for POTS and another for xDSL. In this invention the POTS transformer and the xDSL transformer are combined into one transformer. This is achieved by choosing a special geometric form for the core and by choosing strategic locations for the windings. A portion of the core is dedicated to serve as a shunt for each component of the magnetic field produced by the inductors. The geometric form of the core also provides a closed circuit of high permeability to restrict, to the core, the magnetic field produced by the current in the inductors. The windings of strongly coupled inductors are wound around the same portion of the core whereas the windings of weakly coupled inductors are wound around different core portions which are separated by the shunt. In overlaid POTS and xDSL applications a weak magnetic coupling between any one of the inductors used for POTS and any one of those used for xDSL services can therefore be achieved, despite their close proximity, by arranging the windings used for POTS and those of xDSL services around different portions of the core. Combining two transformers into one considerably reduces the weight volume and cost of the POTS+xDSL circuits.

In accordance with a first broad aspect, a transformer consists of a core formed by two coil portions, one central portion and connecting portions such that the central portion is spaced between the two coil portions and the connecting portions interconnect both ends of the central portion with the corresponding ends of the two coil portions. There is at least one first primary winding and at least one first secondary winding wound around one of the two coil portions of the core. There is also at least one second primary winding and at least one second secondary winding wound around the other coil portion of the core. The central portion is adapted to provide a shunt for components of the magnetic field produced by electric current in the windings.

The transformer may have two first primary windings and one first secondary winding. It may also have two second primary windings and one second secondary winding. The turn ratio of either of the two first primary windings to the first secondary winding may be 1:1 and the turn ratio of either of the two second primary windings to the second secondary winding may be 1:1. The transformer may be connected such that the two first primary windings are connected to a capacitor and connected to two conductors of a copper analogue loop, which is used to connect subscriber customer premise equipment (CPE) to a central office (CO). The two conductors are referred to as TIP and RING. The two first primary windings and the capacitor may form a high pass filter (HPF) and the first secondary winding may be connected to any type of digital subscriber loop (xDSL) circuit. The two first primary windings may be connected to one side of a low pass filter (LPF). The two second primary windings may be connected to another side of the LPF and the second secondary windings may be connected to a plain old telephone service (POTS) circuit.

The core of the transformer may be iron, laminated iron, powdered iron, ferrite or any other suitable magnetic material.

The cross-sectional area of the central portion of the transformer, in relation to the cross-sectional of its coils and connecting portions, may be specified to regulate the extent to which components of the magnetic field produced by electric currents in the windings are shunted through the central portion. In this way the strength of the magnetic coupling between any one of the first windings and any one of the second windings can be tuned by controlling the extent to which the components of the magnetic field are shunted through the central portion.

Each portion of the transformer may be a rectangular parallelepiped. The approximate width, height and depth of the central portion may be 12 mm, 12 mm and 6 mm, respectively. The approximate width, height and depth of the coil portions may be 1.5 mm, 12 mm and 6 mm, respectively. Finally, the approximate width, height and depth of the connecting portions may be 3 mm, 1.5 mm and 6 mm, respectively. The magnetic coupling between any one of the first windings and any one of the second windings may be in the range 0.01 to 0.25, whereas the magnetic coupling between any two first windings or any two second windings may be in the range 0.9 to 0.9999.

An air gap may be inserted into the core between the first primary and secondary windings of the transformer and its thickness may be approximately 0.1 mm. A second air gap may also into the core between the second primary and secondary windings of the transformer and its thickness may be approximately 0.1 mm.

The invention makes use of a combined POTS and xDSL transformer to reduce the cost and volume of the overlaid POTS and xDSL circuits. The combined transformer results in a reduced inventory. In addition, the combined transformer allows an increased line density which results in savings per line (per customer) by sharing common equipment costs among a large number of lines.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
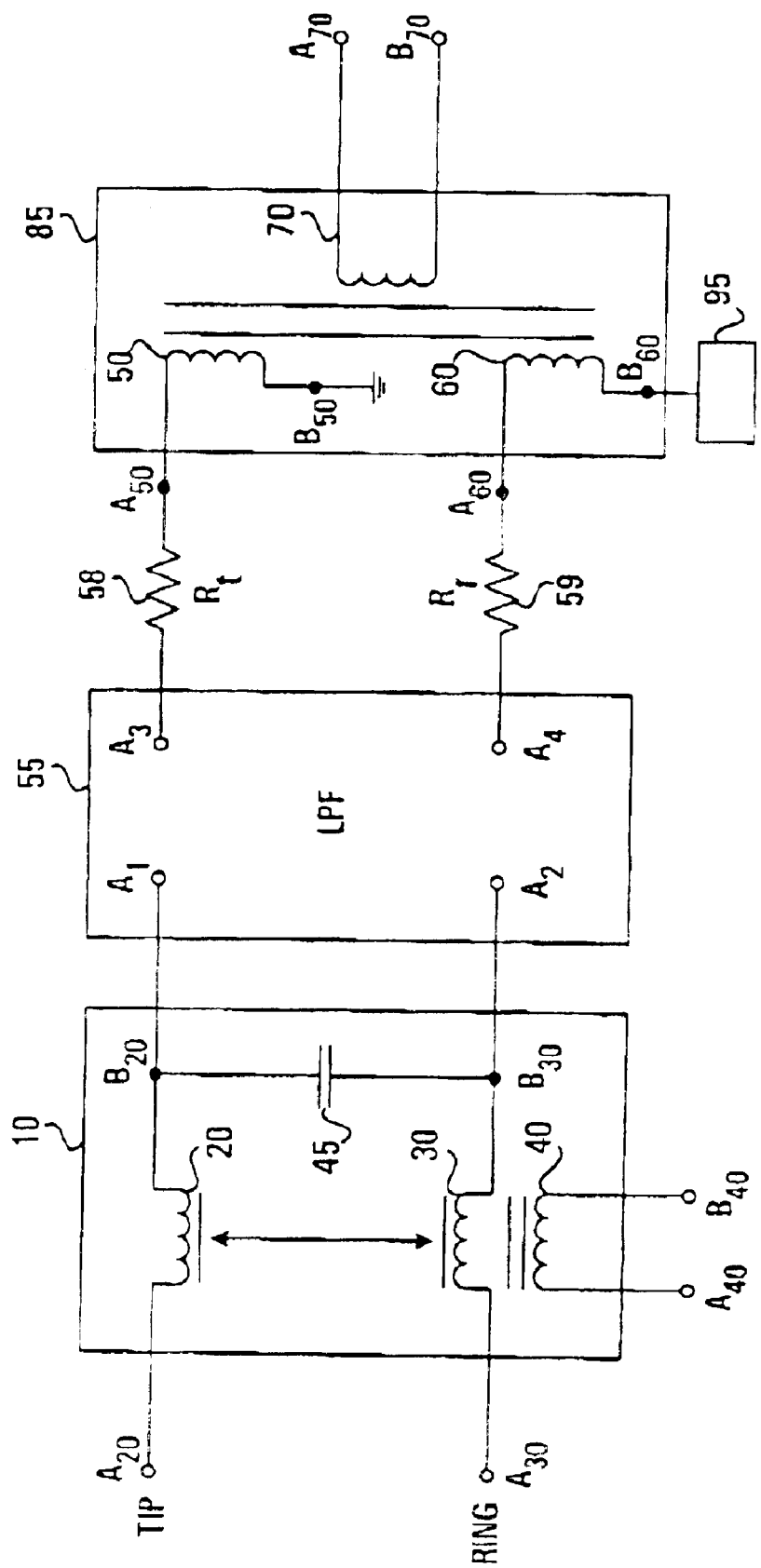
FIG. 1 is a diagram of a typical electrical circuit which is used in overlaid plain old telephone services (POTS) and any type of digital subscriber loop (xDSL) services.

FIG. 1 is a diagram of a typical arrangement of components which are used in overlaid plain old telephone services (POTS) plus any type of digital subscriber loop (xDSL) services. The arrangement of FIG. 1 includes a transformer 10. The transformer 10 consists of two first primary windings 20 and 30, a first secondary winding 40 and a capacitor 45. Traditionally, the two conductors of a copper analogue loop, which is used to connect the subscriber customer premise equipment (CPE) to the central office (CO), are referred to as the TIP and RING. Leads $A_{20}$ and $B_{20}$ of the first primary winding 20 are connected to the TIP and to a terminal $A_1$ of a low-pass filter (LPF) 55, respectively. Terminals $A_{30}$ and $B_{30}$ of the first primary winding 30 are connected to the RING and a terminal $A_2$ of the LPF 55, respectively. Terminals $A_{40}$ and $B_{40}$ of the first secondary winding 40 are connected to a xDSL circuit. The terminals $B_{20}$ and $B_{30}$ of the first primary windings 20 and 30, respectively, are connected to the capacitor 45.

Terminals $A_3$ and $A_4$ of the LPF 55 are connected to resistors 58 and 59, respectively. The resistors 58 and 59 are connected to a transformer 85. The transformer 85 consists of two second primary windings 50 and 60 and a second secondary winding 70. The resistor 58 is connected to a terminal $A_{50}$ of the second primary winding 50 and a terminal $B_{50}$ of the second primary winding 50 is connected to ground. The resistor 59 is connected to a terminal $A_{60}$ of the second primary winding 60 and a terminal $B_{60}$ of the second primary winding 60 is connected to a CO (−48 V) battery 95. Terminals $A_{70}$ and $B_{70}$ of the second secondary winding 70 of the transformer 85 are connected to the voice circuit of the CO.

Both POTS and xDSL signals are transmitted and received at the TIP and RING. The combination of the capacitor 45 and the first primary windings 20 and 30, which operate as inductors, serve as a high pass filter for the high frequency xDSL signal. The first secondary winding 40 is used to couple the xDSL signal between terminals $A_{20}$ and $A_{30}$ of the first primary windings 20 and 30, respectively, and terminals $A_{40}$ and $B_{40}$ of the first secondary winding 40.

The LPF 55 connected to the terminals $B_{20}$ and $B_{30}$ of the first primary windings 20 and 30, respectively, serves to transmit the low frequency POTS signal in the traditional 4 kHz channel bandwidth to its terminals $A_3$ and $A_4$. The resistors 58 and 59 are used to provide terminating impedance and a direct current (DC) loop current limit to the copper analogue loop and the LPF 55.

The transformer 85 is used to provide a direct current (DC) to the copper analogue loop in addition to the POTS signal. The DC current is needed to operate a telephone set at the CPE. By connecting the terminal $B_{50}$ of the second primary winding 50 to ground and connecting the terminal $B_{60}$ of the second primary winding 60 to the CO (−48 V) battery 95 a potential difference between the TIP and RING is created driving a component of current through the copper analogue loop. The second primary windings 50 and 60 and the second secondary winding 70 couple the POTS signal between the terminals $A_{50}$ and $A_{60}$ of the second primary windings 50 and 60, respectively, and the terminals $A_{70}$ and $B_{70}$ of the second secondary winding 70.

The POTS transformer 85 and the xDSL transformer 10 are in the same physical component. The POTS signal and the xDSL signal are isolated from each other because of a small magnetic coupling coefficient, k, between them.

Figure 2:
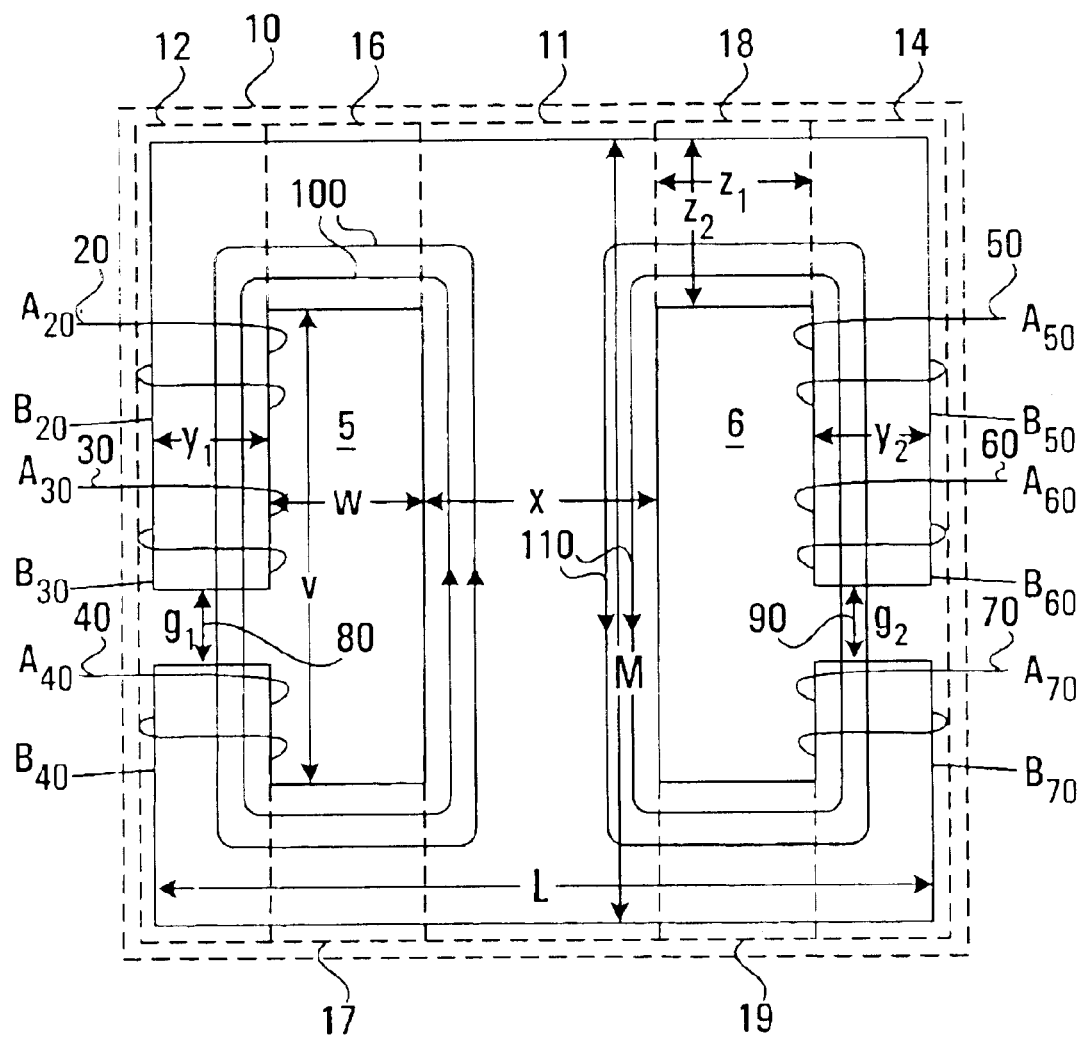
FIG. 2 is a transformer which combines two transformers of FIG. 1, one for POTS and another for xDSL services, into a single transformer.

Referring to FIG. 2 which shows a transformer according to the invention, the transformer has a ferromagnetic core 10 which is rectangular in cross-section and is provided with two parallel rectangular holes 5 and 6 extending therethrough. It is convenient in describing the structure and operation of the transformer to refer to portions 11, 12, 14, 16, 17, 18 and 19 of the core. Portions 11, 12, 14, 16, 17, 18 and 19 are rectangular parallelepipeds. Portion 11 is a central portion or leg defined between the two holes 5 and 6. Portions 12 and 14 are two marginal portions of the core 10 each defined by one of the holes 5 and 6 and one outside edge of the core 10. Portions 12 and 14 may be referred to as coil portions because they are designed to carry windings or coils 20, 30, 40, 50, 60 and 70 which correspond to the windings 20, 30, 40, 50, 60, 70 shown in FIG. 1. Thus coil portion 12 carries a first two primary windings 20 and 30 and a first secondary winding 40 and a coil portion 14 carries a second two primary windings 50 and 60 and a second secondary winding 70. The coil portions 12 and 14 may also have optional air gaps 80 and 90, respectively. The air gaps 80 and 90 prevent magnetic saturation of the core 10 by the DC current.

Typical dimensions of the core 10 are 12 mm, 12 mm and 6 mm for the width (L), height (M) and depth, respectively. The holes 5 and 6 each have width (W) 3 mm and height (V) 9 mm. The central portion 11 has a width (X), height (M) and depth of 3 mm, 12 mm and 6 mm, respectively. The width $(y_1)$, height (M) and depth of the coil portion 12 is 1.5 mm, 12 mm and 6 mm, respectively. The width $(Y_2)$, height (M) and depth of the coil portion 14 is 1.5 mm, 12 mm and 6 mm, respectively. The air gaps 80 and 90 are 0.1 mm wide. Portions 16, 17, 18 and 19 all have a width $(Z_1)$, height $(Z_2)$ and depth of 3 mm, 1.5 mm and 6 mm, respectively. The turn ratio of either first primary winding 20 or 30 to the first secondary winding 40 is 1:1. Similarly, the turn ratio of either second primary winding 50 or 60 to the second secondary winding 70 is 1:1. In another embodiment of the invention, portions 12 and 14 may have more than one secondary winding and the turn ratios between primary and secondary windings may be different than 1:1.

Each of the first primary windings 20 and 30, the first secondary winding 40, the second primary windings 40 and 50 and the second secondary winding 70 produces a component of the total magnetic field inside the core 10. The set of first primary windings 20 and 30 and first secondary winding 40 produce magnetic field lines 100 and the set of second primary windings 50 and 60 and second secondary winding 70 produce magnetic field lines 110.

The terminal leads Ai and Bi of winding i (where i=20, 30, 40, 50, 60 or 70) in FIG. 2 correspond to the respective terminal leads Ai and Bi in FIG. 1.

The first primary windings 20 and 30 and the first secondary. winding 40 are used for xDSL and the second primary windings 50 and 60 and the second secondary winding 70 are used for POTS services. Together, they are used in overlaid POTS and xDSL applications. The first primary windings 20 and 30, the first secondary winding 40, the second primary windings 40 and 50 and the second secondary winding 70 are coupled to each other through the core 10. In overlaid POTS and xDSL applications a strong magnetic coupling is required between any of the windings used for POTS. Similarly, a strong magnetic coupling is required between any of the windings used for xDSL. On the other hand, a weak magnetic coupling between any one winding used for POTS and any one winding used for xDSL is required. In the arrangement of FIG. 1 the magnetic coupling M15 coefficient, k, between any of the first primary windings 20 and 30 and first secondary winding 40 is between 0.9 to 0.9999. Similarly, the magnetic coupling coefficient between any of the second primary windings 50 and 60 and second secondary winding 70 is between 0.9 to 0.9999. This strong magnetic coupling is compatible with existing overlaid POTS and xDSL technology which uses two transformers in lieu of the combined transformer of this Figure. On the other hand, the magnetic coupling coefficient between any one of the first primary windings 20 and 30 and first secondary winding 40, and any one of the second primary windings 50 and 60 and second secondary winding 70 is between 0.01 to 0.25. This weak magnetic coupling is low enough so that the signals (noise) due to the coupling does not affect the performance of the overlaid POTS and xDSL service.

The weak magnetic coupling between any one of the first primary windings 20 and 30 and first secondary winding 40 and any one of the second primary windings 50 and 60 and second secondary winding 70 is achieved despite the fact that they are in close proximity. The central portion 11 acts as a shunt for the magnetic field lines 100 produced by electrical currents in the first primary windings 20 and 30 and the first secondary winding 40. Similarly, the central portion 11 acts as a shunt for the magnetic field lines 110 produced by electrical current in the second primary windings 50 and 60 and the second secondary winding 70. Since the magnetic field lines 100 and 110 are shunted through the central portion 11, the magnetic flux through any one of the second primary windings 50 and 60 and second secondary winding 70 due to components of the magnetic field produced by any one of the first primary windings 20 and 30 and first secondary winding 40 is small. As a result the mutual inductance, and consequently the magnetic coupling coefficient, between any one of the first primary windings 20 and 30 and first secondary winding 40 and any one of the second primary windings 50 and 60 and second secondary winding 70 is low. On the other hand, the magnetic flux through a winding in portion 12 or 14 due to the component of magnetic field produced by a winding in the same portion is large and consequently the magnetic coupling coefficient is high.

The shunt effect can be understood from the reluctance of the circuit. The reluctance in a magnetic circuit decreases with decreasing length of the circuit, increasing cross-sectional area of the circuit and increasing permeability of the material. In FIG. 2, a component of magnetic field produced by the first primary windings 20 and 30 and the first secondary winding 40 may follow a closed circuit through the central portion 11 or through the portions 19, 14 and 18. The cross-sectional of the central portion 11 is greater than that of the portions 19, 14 and 18 and the length of a circuit through the central portion 11 is shorter than the length of a circuit through portions 19, 14 and 18. In addition, the presence of the air gap 90 also increases the reluctance of portion 14. The reluctance of the central portion is therefore much lower than that of the combined portions 19, 14 and 18, and the air gap 90. The lower reluctance of the central portion 11 results in the components of the magnetic field produced by the first primary windings 20 and 30 and the first secondary winding 40 to be shunted through the central portion 11. Similarly, the lower reluctance of the central portion 11 compared to the combined portions 16, 12 and 17 results in the components of the magnetic field produced by the second primary windings 50 and 60 and the second secondary winding 70 to be shunted through the central portion 11.

The overall effect of the geometric form of the core 10 is to shield the second primary windings 50 and 60 and the second secondary winding 70 from the magnetic field lines from the first primary windings 20 and 30 and the first secondary winding 40, and vice-versa, to minimise the magnetic coupling coefficient, k, between windings of opposite sides of the core 10. This is achieved despite the fact that the two sets of windings are in close proximity to each other.

In the preferred embodiment of the invention the cross-sectional area of portion 11 is chosen, in relation to other dimensions of portions of the core 10, to shunt components of magnetic field through the central portion 11. The result is a magnetic coupling coefficient between two windings wound around different coil portions of the core 10 in the range 0.01 to 0.25. In another embodiment, the cross-sectional area of portion 11 may be specified to tune the magnetic coupling coefficient from weak coupling to strong coupling. For example, reducing the cross-sectional area of portion 11 results in a decrease in the extent to which the components of the magnetic field are shunted through portion 11 and consequently the magnetic coupling coefficient between two windings wound around different coil portions of the core 10 increases.

In the preferred embodiment of the invention, the core 10 is a rectangular parallelepiped. In another embodiment, the core and portions thereof may have different shapes as long as there is at least one shunt portion which can be used to shunt the magnetic field lines of the other portions. The specifications required to produce a shunt effect is a high permeability, short length and large cross-sectional area of the shunt portion.

The first primary windings 20 and 30, the first secondary winding 40, the second primary windings 40 and 50 and the second secondary winding 70 are oriented such that the magnetic field lines 100 and 110 are in opposite directions throughout the core 11. The effect is to decrease the total magnetic field throughout the core 11. In overlaid POTS and xDSL applications, the magnetising inductance of the first primary winding 20 when connected in series with the first primary winding 30 is approximately 2 mH. Since the turn ratio of the first primary windings 20 and 30 to the first secondary winding 40 is 1:1 the magnetising inductance of the first secondary winding 40 is also 2 mH. The magnetising inductance of the second primary winding 50 in series with the second primary winding 60 is approximately 100 mH. Therefore, since the turn ratio of the second primary windings 50 and 60 to the second secondary winding 70 is 1:1, the magnetising inductance of the second secondary winding 70 is also 100 mH. Since the magnetising inductance of the first primary windings 20 and 30 and the first secondary winding 50 is different than the magnetising inductance of the second primary windings 50 and 60 and the second secondary winding 70, the magnitudes of the DC magnetic fields in portion 11 differ significantly. Therefore, the effect of opposing magnetic fields on the total magnetic field is minimal in overlaid POTS and xDSL applications. As a consequence the effect of opposing magnetic fields on saturation in portion 11 is not very significant. While FIGS. 1 and 2 show one secondary winding for the xDSL circuit and one secondary winding for the POTS circuit it is known to those skilled in the art that there could be more than one secondary winding for xDSL and more than one secondary winding for POTS. In such a case in which portions 12 and 14 have more than one secondary winding, or if the turn ratios between the primary and secondary windings are different than 1:1, the effect of opposing magnetic fields on saturation in portion 11 may be significant.

When compared with the two transformers of POTS and xDSL in conventional overlaid POTS and xDSL arrangements, the single transformer in the arrangement of FIG. 2 requires 22% less volume and the cost is reduced to 60%.

Numerous modifications and variations of the present invention are possible in light of the above teachings. It is therefore to be understood that within the scope of the appended claims, the invention may be practised otherwise than as specifically described herein.

We claim:

1. A transformer comprising:
   a core comprising two marginal portions each having two ends, a central portion having two ends and located in spaced relation between the two marginal portions and connecting portions interconnecting both ends of the central portion with corresponding ends of the two marginal portions;
   at least one first primary winding and at least one first secondary winding wound around one of the two marginal portions; and
   at least one second primary winding and at least one second secondary winding wound round the other of the two marginal portions;
   wherein the central portion is adapted to provide a shunt for components of the magnetic field produced by electric current the winding; and
   wherein the at least one first primary winding comprises two first primary windings, the at least one first secondary winding comprises one first secondary winding, the at least one second primary winding comprises two second primary windings and the at least one second secondary winding comprises one second secondary winding.

2. A transformer according to claim 1 wherein:
   the turn ratio of either of the two first primary windimgs to the first secondary winding is 1:1; and
   the turn ratio of either of the two second primary windings to the second secondary winding is 1:1.

3. A transformer according to claim 1 further comprising:
   means for connecting the two first primary windings to TIP and RING leads of a combined plain old telephone services (POTS) and any type of digital subscriber loop (xDSL) services and to a capacitor whereby the two first primary windings and the capacitor form a high pass filter (HPF);
   means for connecting the first secondary winding to an xDSL circuit;
   means for connecting the two first primary windings to one side of a low pass filter (LPF);
   means for connecting the two second primary windings to another side of the LPF; and
   means for connecting the second secondary winding to a POTS circuit.

4. A transformer according to claim 1 wherein the cross-sectional area of the central portion, in relation to the dimensions of the marginal and connecting portions, is specified to regulate the extent to which components of the magnetic field produced by electric currents the windings are shunted through the central portion,
   whereby the strength of the magnetic coupling between any one of the first primary and secondary windings and any one of the second primary and secondary windings is tuned by the extent to which the components of the magnetic field are shunted through the central portion.

5. A transformer according to claim 1 wherein the core portions are rectangular parallelepipeds.

6. A transformer according to claim 5 wherein:
   the approximate width, height and depth of central portion is 12 mm, 12 mm and 6 mm, respectively;
   the approximate width, height and depth of the marginal portions is 1.5 mm, 12 mm and 6 mm, respectively; and
   the approximate width, height and depth of the connecting portions is 3 mm, 1.5 mm and 6 mm, respectively.

7. A transformer according to claim 6 wherein the magnetic coupling between any one of the first windings and any one of the second windings is in the range 0.01 to 0.25.

8. A transformer according to claim 6 wherein the magnetic coupling between any two first windings is in the range 0.9 to 0.9999 and the magnetic coupling between any two second winding is in the range 0.9 to 0.9999.

9. A transformer according to claim 1 further comprising a first air gap inserted across the one marginal portion between the first primary and secondary windings.

10. A transformer according to claim 9 wherein the first air gap is approximately 0.1 mm in width.

11. A transformer according to claim 9 further comprising a second air gap inserted across the other marginal portion between the second primary and secondary windings.

12. A transformer according to claim 11 wherein the second air gap is approximately 0.1 mm in width.

13. A transformer for combined POTS and xDSL service comprising:
   a core comprising two marginal portions each having two ends, a central portion having two ends and located in spaced relation between the two marginal portions and connecting portions interconnecting both ends of the central portion with corresponding ends of the two marginal portions;
   two first primary windings and at least one first secondary winding wound around one of the two core marginal portions;
   two second primary windings and at least one second secondary winding wound around the other of the core marginal portions for connecting the two first primary windings to TIP and RING and to a capacitor whereby the two first primary windings and the capacitor form a high pass filter (HPF);
   terminals for connecting the first secondary winding to any type of digital subscriber loop (xDSL) circuit;
   terminals for connecting the two first primary windings to one side of a low pass filter (LPF);
   terminals for connecting the two second primary windings to another side of the LPF; and
   terminals for connecting the second secondary winding to a plain old telephone service (POTS) circuit;

wherein the central portion of the core serves as a shunt to ensure only a very weak magnetic coupling between any one of the first windings and any one of the second windings relative to the magnetic coupling between any two first windings or any two second windings.

14. A transformer according to claim 13 wherein the magnetic coupling coefficient between any one of the first windings and any one of the second windings is in the range 0.01 to 0.25 and the magnetic coupling coefficient between any two first windings and between any two second windings is in the range 0.9 to 0.9999.

15. A transformer according to claim 13 further comprising a first air gap provided in the one marginal portion between the first primary windings and the first secondary winding and a second air gap provided in the other marginal portion between the second primary windings and the second secondary winding.

16. A transformer according to claim 14 further comprising a first air gap provided in the one marginal portion between the first primary windings and the first secondary winding and a second air gap provided in the other marginal portion between the second primary windings and the second secondary winding.

17. A transformer according to claim 13 wherein the core is rectangular in cross-section with two rectangular holes extending therethrough to define the central, marginal and connecting portions of the core as parallelepipeds.

18. A transformer comprising:
a core comprising two marginal portions each having two ends, a central portion formed of a single piece of material and having two ends and located in spaced relation between the two marginal portions and connecting portions interconnecting both ends of the central portion with corresponding ends of the two marginal portions;
at least one first primary winding and at least one first secondary winding wound around one of the two marginal portions; and
at least one second primary winding and at least one second secondary winding wound around the other of the two marginal portions, the at least one second primary winding and the at least one second secondary winding not being directly connected to respective ones of the at least one first primary winding and the at least one first secondary winding;
wherein the central portion is adapted to provide a shunt for components of the magnetic field produced by electric current in the windings.

19. A transformer according to claim 18 wherein the at least one first primary winding comprises two first primary windings, the at least one first secondary winding comprises one first secondary winding, the at least one second primary winding comprise two second primary windings and the at least one second secondary winding comprises one second secondary winding.

20. A transformer according to claim 19 wherein:
the turn ratio of either of the two first primary windings to the first secondary winding is 1:1; and
the turn ratio of either of the two second primary windings to the second secondary winding is 1:1.

21. A transformer according to claim 19 further comprising:
means for connecting the two first primary windings to TIP and RING leads of a combined plain old telephone services (POTS) and any type of digital subscriber loop (xDSL) services and to a capacitor whereby the two first primary windings and the capacitor form a high pass filter (HPF);

means for connecting the first secondary winding to an xDSL circuit;
means for connecting the two first primary windings to one side of a low pass filter (LPF);
means for connecting the two second primary windings to another side of the LPF; and
means for connecting the second secondary winding to a POTS circuit.

22. A transformer according to claim 18 wherein the cross-sectional area of the central portion, in relation to the dimensions of the marginal and connecting portions, is specified to regulate the extent to which components of the magnetic field produced by electric currents in the windings are shunted through the central portion,
whereby the strength of the magnetic coupling between any one of the first primary and secondary windings and any one of the second primary and secondary windings is tuned by the extent to which the components of the magnetic field are shunted through the central portion.

23. A transformer according to claim 18 further comprising a first air gap inserted across the one marginal portion between the first primary and secondary windings.

24. A transformer according to claim 23 further comprising a second air gap inserted across the other marginal portion between the second primary and second windings.

25. A transformer comprising:
a core comprising two marginal portions each having two ends, a central portion having two ends and located in spaced relation between the two marginal portions and connecting portions interconnecting both ends of the central portion with corresponding ends of the two marginal portions;
at least one first primary winding and at least one first secondary winding wound around one of the two marginal potions; and
at least one second primary winding and at least one second secondary winding wound around the other of tho two marginal portions, the at least one second primary winding and the at least one second secondary winding not being directly connected to respective ones of the at least one fist primary winding and the at least one first secondary winding;
wherein the central portion is adapted to provide a shunt for components of the magnetic field produced by electric current in the windings; and
wherein the at least one first primary winding comprises two st primary windings, the at least one first secondary winding comprises one first secondary winding, the at least one second primary winding comprises two second primary windings and the at least one second secondary winding comprises one second secondary winding.

26. A transformer according to claim 25 wherein:
the turn ratio of either of the two first primary windings to the first secondary winding is 1:1; and
the turn ratio of either of the two second primary windings to the second secondary winding is 1:1.

27. A transformer according to claim 25 further comprising:
means for connecting the two first primary windings to TIP and RING leads of a combined plain old telephone services (POTS) and any type of digital subscriber loop (xDSL) services and to a capacitor whereby the two first primary winding and the capacitor form a high pass filter (HPF);

means for connecting the first secondary winding to an xDSL circuit;

means for connecting the two first primary windings to one side of a low pass filter (LPF);

means for connecting the two second primary windings to another side of the LPF; and means for connecting the second secondary winding to a POTS circuit.

28. A transformer according to claim 25 wherein the cross-sectional area of the central portion, in relation to the dimensions of the marginal and connecting portions, is specified to regulate the extent to which components of the magnetic field produced by electric currents in the windings are shunted through the central position, whereby the strength of the magnetic coupling between any one of the first primary and secondary windings and any one of the second primary and secondary windings is tuned by the extent to which the components of the magnetic field are shunted through the central portion.

29. A transformer according to claim 25 further comprising a first air gap inserted across the one marginal portion between the first primary and secondary windings.

30. A transformer according to claim 29 further comprising a second air gap inserted across the other marginal portion between the second primary and secondary windings.

* * * * *

UNITED STATES PATENT AND TRADEMARK OFFICE
CERTIFICATE OF CORRECTION

PATENT NO. : 6,822,546 B1
DATED : November 23, 2004
INVENTOR(S) : Gyula G. Jakab et al.

It is certified that error appears in the above-identified patent and that said Letters Patent is hereby corrected as shown below:

Column 7,
Line 41, change "...the winding; and" to read -- ...in the windings; and --
Line 50, change "...windings" to read -- ...windings... --

Column 8,
Line 31, change "...winding..." to read -- ...windings... --

Column 9,
Line 52, change "...comprise..." to read -- ...comprises... --

Column 10,
Line 40, change "...thu..." to read -- ...the... --
Line 43, change "...fist..." to read -- ...first... --
Line 49, change "...st..." to read -- ...first... --
Line 66, change "...winding..." to read -- ...windings... --

Column 11,
Line 14, change "...position..." to read -- ...portion... --

Signed and Sealed this

First Day of March, 2005

JON W. DUDAS
*Director of the United States Patent and Trademark Office*